R. HARTWIG.
CRANK PIN CONNECTION.
APPLICATION FILED APR. 21, 1910.

1,136,524.

Patented Apr. 20, 1915.

Witnesses:
J. M. Wynkoop.
C. B. Melton.

Inventor.
Rudolf Hartwig,
By
his attorneys.

UNITED STATES PATENT OFFICE.

RUDOLF HARTWIG, OF ESSEN-ON-THE-RUHR, GERMANY, ASSIGNOR TO FRIED. KRUPP AKTIENGESELLSCHAFT, OF ESSEN-ON-THE-RUHR, GERMANY.

CRANK-PIN CONNECTION.

1,136,524.          Specification of Letters Patent.          Patented Apr. 20, 1915.

Application filed April 21, 1910. Serial No. 556,789.

*To all whom it may concern:*

Be it known that I, RUDOLF HARTWIG, a subject of the Emperor of Germany, and a resident of Essen-on-the-Ruhr, Germany, have invented certain new and useful Improvements in Crank-Pin Connections, of which the following is a specification.

This invention relates to pin connections for the transmission of power, and in which a shouldered pin seats against the pin-receiving member with the usual fillet at the base of the pin and the intervening annular recess to receive the same, which results from the practice, necessary in engineering, of avoiding sharp angles in reducing from a larger to a smaller diameter, and permitting the shoulder of the pin to seat against the pin-receiving member without contact of the curved pin base or fillet with the mouth of the bore that receives the pin.

The purpose of the invention is to provide a pin connection of this kind, in which the breadth of the pin-receiving member, under otherwise equal circumstances, may be kept comparatively small. This purpose is attained, according to the present invention by locating the fillet at the base of the pin, within the abutting plane of the shoulder on the pin-carrying member so that the rounding out or enlargement at the mouth of the bore, which receives the pin and the consequent reduction in the length of the pin bearing, may be entirely done away with. In other words, the annular recess, which accommodates the fillet or curved pin base where it joins on to the pin-carrying member, is located within the shoulder of the pin-carrying member and the abutting face of the latter surrounds said recess, like a mushroom.

Figure 1:
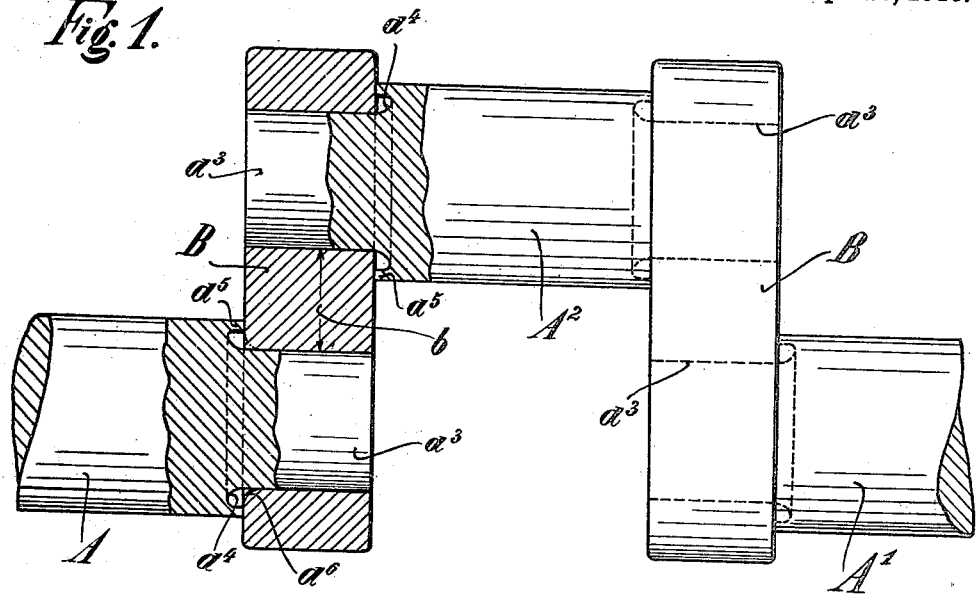
Figure 2:
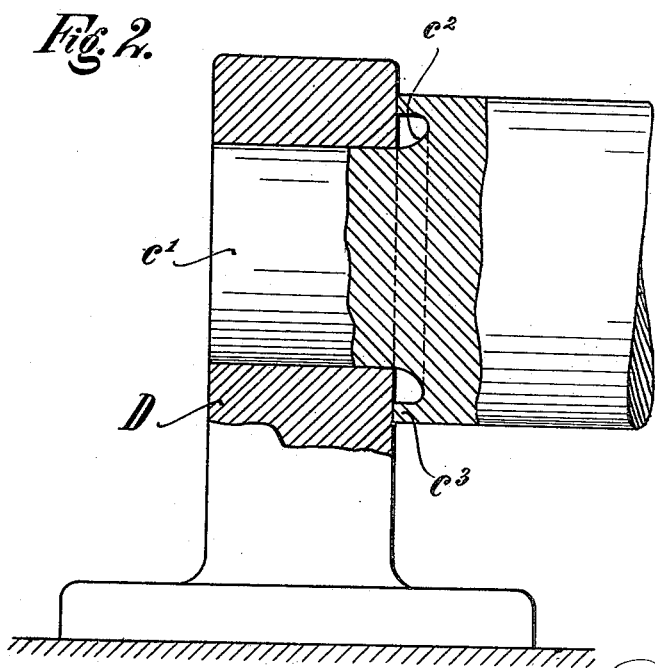
Figure 3:
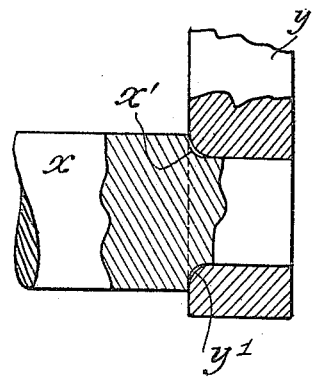

Two examples of the use of a pin connection, constructed in accordance with the present invention, are shown in the accompanying drawings, in which, Figure 1 shows a crank shaft built up of several parts; and Fig. 2 is a shaft having a pin resting in a bearing. Fig. 3 is a diagrammatic view, illustrating the condition which it is the object of the invention to avoid.

In Fig. 1, in which is shown the first example of the use of a pin connection constructed in accordance with the invention, A and A' designate the two portions of the shaft lying coaxially with the axis of rotation, $A^2$ is the crank pin and B are the two crank arms. The shaft members A and A' as well as the crank pin $A^2$ are provided, in the manner shown in the drawing, with cylindrical pin-shaped extensions $a^3$, which are inserted in corresponding bores of the crank arms B. The crank arms B are connected with the shaft members A and A' as well as with the crank pin $A^2$ by shrinking, giving a grip on the pin shaped extension with the full length of the cylindrical bore, which coincides with the breadth of the arms B. Each of the pin-shaped projections $a^3$ is integrally connected through a fillet $a^4$ with the member which carries the pin. As will be seen from the drawing, in each place of connection, the fillet $a^4$ lies wholly within and is surrounded by an annular mushroom extension of the member which carries the pin. Each of these annular extensions $a^5$ lies with its face against the adjacent surface of the crank arm B. An annular undercut is thus formed in the member around the pin-shaped extension $a^3$, without in the least weakening the shrinkage connection.

Heretofore, in the manufacture of interrupted shafts of the described kind, it was customary to have in each place of connection, the fillet of the pin-shaped projection upon which the crank arm is shrunk, extending into the bore of the crank arm as shown in Fig. 3, wherein $x$ represents the shaft with its fillet $x'$ as heretofore constructed, and $y$ represents the pin-receiving member which has heretofore been hollowed out or counter-sunk as at $y'$ with a corresponding reduction in the length of the pin bearing. By the present invention, entirely aside from the fact that the production of a rounding in the crank arm corresponding to the fillet of the pin-shaped projection is entirely done away with, the advantage is attained that the security of the shrunk joint for a given length of the cylindrical portion of the pin-like projection, is greater with equal breadth of crank arm; or in other words, with equal security of shrunk joint, a lesser breadth of crank arm will obtain.

The present invention is of especial importance for those interrupted crank shafts in which it is necessary to make the crank radius very small. Since the wall strength $b$ measured in the direction of the crank radius, of those parts of the crank arm which lie between the bores that receive the pins $a^3$ cannot be less than a specified degree, one is compelled, in order to obtain the smallest possible crank radius, to make the pin-shaped projections $a^3$, of the smallest possible diameter; that is to say, to offset them considerably from the shaft members A and A' or the crank pin $A^2$. In order now to insure full strength, in such cases, to the attaching portions of the pin-like projections, it has been necessary to curve the fillet on a somewhat large radius. Now when, as was heretofore customary, this fillet is permitted to extend into the bore of the crank arm, the security of the shrunk joint was effected, owing to the comparatively severe shortening of the cylindrical portion of the pin-like projection. This disadvantage is done away with by the present invention.

In Fig. 2, which shows a pin connection in which one of the two connected members can rotate relatively to the other, C represents a shaft which rests in a bearing D, through the medium of a pin $c'$. The pin $c'$, which has a cylindrical bearing surface, is connected through a fillet $c^2$ with the portion of the shaft, which carries it. As will be seen from the drawing, the fillet $c^2$ lies completely within the inclosing annular mushroom extension $c^3$ of the shaft whose front face abuts against the adjacent surface of the bearing D. In other words an annular undercut in the shaft C is formed around the pin $c^1$, which undercut, however, does not diminish the bearing surface, that is to say, the cylindrical portion of the boundary surface of the bore, the undercut being located completely within the pin carrying member C. Heretofore, it has been customary, in the mounting of shafts of this kind to permit the fillet of the pin to extend into the bearing as shown at $x'$, $y'$, Fig. 3.

By the present invention, the important advantage is attained, entirely aside from avoiding the production of a countersink in the bearing, corresponding to the fillet of the pin, that with equal breadth of bearing the carrying portion, that is to say, the cylindrical portion of the bearing surface, is essentially greater, so that the specific surface impingement is correspondingly smaller; or conversely, with equal specific surface impingement a bearing of more restricted breadth will obtain.

Having thus described my invention, what I claim as new therein and desire to secure by Letters Patent is:—

1. A pin connection comprising a pin and its carrying member integral therewith, and a pin-receiving member having a straight bore in which the pin fits; said pin carrying member having a shoulder which seats against the pin receiving member and being provided with an annular undercut, which lies outside of the pin receiving member and within the pin carrying member.

2. A pin connection comprising a pin, a carrying member integral therewith and a pin receiving member; said carrying member having a seating shoulder which abuts against the pin receiving member; said pin carrying member being constructed with an annular recess with a suitable fillet lying outside of the pin receiving member and within the pin carrying member.

3. A pin connection comprising a pin receiving member having a bore of uniform diameter extending the full width of the member and constructed to contact with the pin throughout the length of the bore; a pin with its integral carrying member, said carrying member being constructed with a face through which it seats against the face of the pin receiving member around the pin; said seating face being constructed with an annular recess having a suitable fillet leaving a portion of the seating face radially outside of said recess, in the form of an annular extension from said carrying member.

4. A crank shaft comprising a shaft in sections coaxially arranged and provided with pins, arms having straight cylindrical bores in which the pins fit, and pins having a common carrying member connecting said arms, said arms having straight cylindrical bores in which said last named pins fit; said shaft sections and pin carrying member having shoulders which seat against said arms, an annular undercut with suitable fillet being provided around each pin in said shoulder, said undercut being seated entirely outside of said arms and within said shoulders; whereby on shrinking said pin and arms together a perfectly secure connection is obtained of great strength and small dimensions.

The foregoing specification signed at Barmen, Germany, this 4th day of April, 1910.

RUDOLF HARTWIG. [L. S.]

In presence of—
OTTO KÖNIG,
WALTER VONNEGUT.

Copies of this patent may be obtained for five cents each, by addressing the "Commissioner of Patents, Washington, D. C."